(12) United States Patent
Martinez-Cruz et al.

(10) Patent No.: US 9,948,073 B2
(45) Date of Patent: Apr. 17, 2018

(54) AUXILIARY COMPARTMENT FOR A SWITCHGEAR SYSTEM

(71) Applicant: ABB Schweiz AG, Baden (CH)

(72) Inventors: Erick Martinez-Cruz, San Luis Potosi (MX); Erika Flores, San Luis Potosi (MX)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/139,788

(22) Filed: Apr. 27, 2016

(65) Prior Publication Data

US 2016/0315454 A1    Oct. 27, 2016

Related U.S. Application Data

(60) Provisional application No. 62/153,448, filed on Apr. 27, 2015.

(51) Int. Cl.
| | |
|---|---|
| *H02B 1/36* | (2006.01) |
| *H02B 13/02* | (2006.01) |
| *H02B 13/00* | (2006.01) |

(52) U.S. Cl.
CPC ............ *H02B 1/36* (2013.01); *H02B 13/005* (2013.01)

(58) Field of Classification Search
CPC ........................................ H02B 1/36
See application file for complete search history.

(56) References Cited

U.S. PATENT DOCUMENTS

| | | | |
|---|---|---|---|
| 2,504,876 A | 4/1950 | Pringle | |
| 4,831,489 A * | 5/1989 | Ozu | H02B 1/36 200/50.17 |
| 5,189,597 A | 2/1993 | Mayer et al. | |
| 5,434,752 A * | 7/1995 | Huth | H01R 27/00 361/212 |
| 5,726,506 A * | 3/1998 | Wood | H02B 1/24 307/147 |
| 7,419,394 B2 * | 9/2008 | Jensen | H01R 13/6315 439/248 |

(Continued)

FOREIGN PATENT DOCUMENTS

WO    2014033069    3/2014

*Primary Examiner* — Robert J Hoffberg
(74) *Attorney, Agent, or Firm* — Taft Stettinius & Hollister LLP (57) ABSTRACT

An auxiliary compartment for housing at least one electrical device is associated with an auxiliary cubicle of a switchgear enclosure. The auxiliary compartment is removably mounted in the corresponding auxiliary cubicle for quick disconnection of the electrical device from an associated circuit breaker in an adjacent circuit breaker cubicle. The auxiliary compartment includes a first connection connected to the electrical device. The auxiliary cubicle includes a second connector attached to the auxiliary compartment rear wall that is removably engageable with the first connector. The second connector is connected with the circuit breaker in the adjacent circuit breaker cubicle. The electrical device in the auxiliary compartment can be quickly disconnected from the power and communication connections with the circuit breaker in the adjacent circuit breaker cubicle by withdrawing the auxiliary compartment from the auxiliary cubicle to disconnect the first and second connectors.

20 Claims, 3 Drawing Sheets

(56) References Cited

U.S. PATENT DOCUMENTS

| | | | |
|---|---|---|---|
| 7,440,262 B2 * | 10/2008 | Coffey | H02B 1/04 |
| | | | 361/627 |
| 8,717,742 B2 * | 5/2014 | Kim | H02B 11/12 |
| | | | 361/612 |
| 2008/0019091 A1 | 1/2008 | Fan et al. | |
| 2013/0050905 A1 | 2/2013 | Kim | |
| 2015/0162727 A1 | 6/2015 | Macias et al. | |

* cited by examiner

AUXILIARY COMPARTMENT FOR A SWITCHGEAR SYSTEM

CROSS-REFERENCE TO RELATED APPLICATION

The present application claims the benefit of the filing date of U.S. Provisional App. Ser. No. 62/153,448 filed on Apr. 27, 2015, which is incorporated herein by reference in its entirety.

FIELD OF INVENTION

The present application is directed to switchgear systems, and more particularly to an enclosure of the switchgear system that includes auxiliary and circuit breaker cubicles and an auxiliary compartment that is removably positionable in a respective auxiliary cubicle to selectively connect to and disconnect from power and communication connections of an associated circuit breaker cubicle.

BACKGROUND

In low voltage switchgear, it is common to mount breaker control instrumentation and other devices in the same compartment that houses the corresponding circuit breaker. However, the breaker control instrumentation and other devices may need to be accessed or maintained on a different basis than the corresponding circuit breaker. Thus, the circuit breaker must be de-energized if a person accessing the breaker control instrumentation is not to be exposed to an energized circuit breaker compartment. It can also be difficult to work on the breaker control instrumentation and other devices while located within an energized circuit breaker compartment. Therefore, further improvements in this area are needed.

SUMMARY

The present disclosure contemplates various aspects relating to improvements in switchgear systems. According to one aspect, an auxiliary compartment for mounting electrical devices such as breaker control instruments in an auxiliary cubicle of an electrical switchgear enclosure is provided. The auxiliary compartment can include a bottom wall, a rear wall, and opposite sidewalls. One of the sidewalls includes a first connector mounted thereto that is connected to the electrical devices in the auxiliary compartment. A second connector is mounted to the rear wall of the auxiliary cubicle of the switchgear enclosure, and is connected to the circuit breaker in an adjacent circuit breaker compartment. The auxiliary compartment is withdrawn from the auxiliary cubicle to disconnect the first and second connectors, which de-energizes the electrical device(s) in the auxiliary compartment and displaces the auxiliary compartment out of the switchgear enclosure for easier access to the electrical device(s) in the auxiliary compartment.

According to another aspect, a method for disconnecting an auxiliary compartment from electrical connections with a circuit breaker in a circuit breaker cubicle of a switchgear system is provided. The auxiliary compartment is accessed and at least partially withdrawn from the auxiliary cubicle, thereby at least partially disconnecting a first connector of the auxiliary compartment from a second connector on the inside of the auxiliary cubicle, disconnecting at least one of power and communication connections between the electrical device(s) of the auxiliary compartment and the circuit breaker. The auxiliary compartment can then be further withdrawn from the auxiliary cubicle along with the electrical device(s) in the auxiliary compartment that are de-energized, the withdrawn auxiliary compartment providing greater access to the electrical device(s) therein.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings

BRIEF DESCRIPTION OF THE DRAWINGS

In the accompanying drawings, structural embodiments are illustrated that, together with the detailed description provided below, describe exemplary embodiments of a withdrawable or removable auxiliary compartment for a switchgear system. One of ordinary skill in the art will appreciate that a component may be designed as multiple components or that multiple components may be designed as a single component.

Further, in the accompanying drawings and description that follow, like parts are indicated throughout the drawings and written description with the same reference numerals, respectively. The figures may not be drawn to scale and the proportions of certain parts may be exaggerated for convenience of illustration.

DETAILED DESCRIPTION

Figure 1:
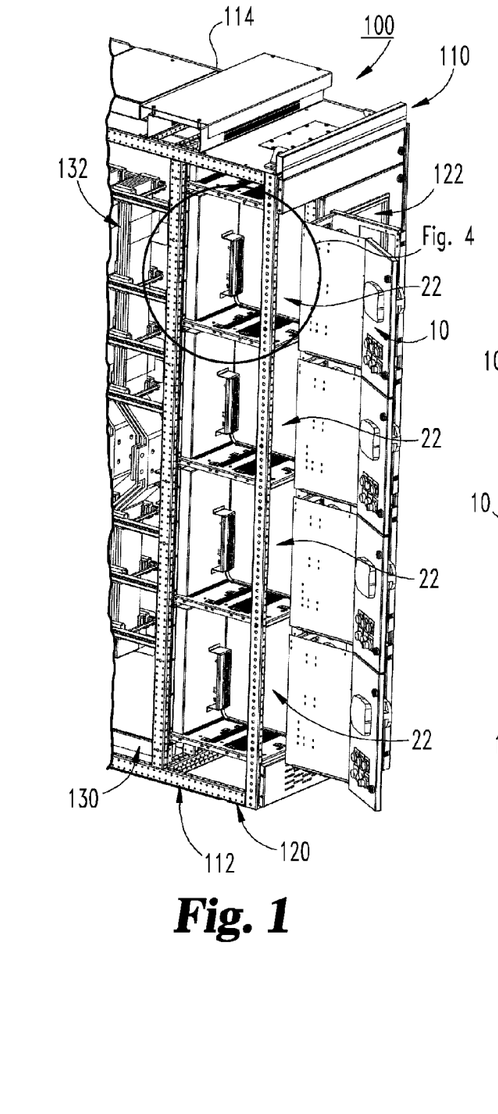
FIG. 1 is a perspective view in partial section of a section of a switchgear system embodied in accordance with the present disclosure with circuit breaker cubicles for housing circuit breakers and auxiliary cubicles for receiving auxiliary compartments that house circuit breaker control instrumentation and other devices.

With reference to FIG. 1, a section of an exemplary electrical switchgear system 100 is shown. In one embodiment, the switchgear system 100 is a low voltage system. As used herein, low voltage refers to voltages that do not generally exceed 600 volts alternating current, or 1200 volts direct current. Other embodiments contemplate non-low voltage applications of the present disclosure. Switchgear system 100 includes a rectangular enclosure 110 that can be made from, for example, reinforced sheet metal. Enclosure 110 forms a number of sections within vertically extending walls (not shown) that extend between and connect a base 112 and a roof 114. For example, the enclosure 110 houses a device section 120, a bus bar section 130 and a cable section (not shown). The cable section houses cables that electrically connect the utility service or other power source to bus bars 132 in the bus bar section 130. The bus bars 132 supply electrical current to at least one circuit breaker 50 and at least one electrical device 23 in the device section 120.

Figure 2:
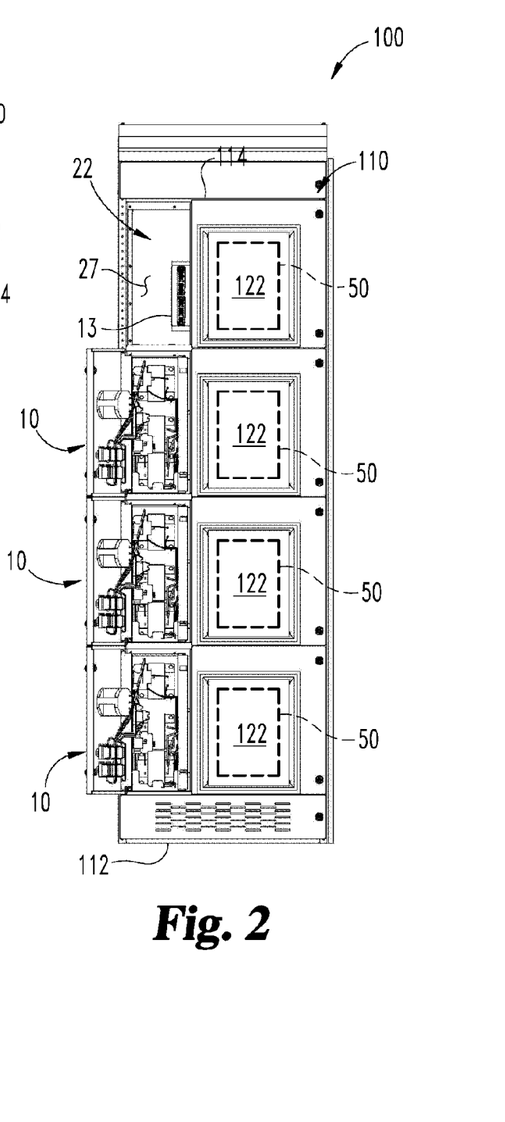
FIG. 2 is a front elevation view of the switchgear system of FIG. 1 with the auxiliary compartments in the auxiliary cubicles.

With further reference to FIG. 2, the device section 120 includes at least one auxiliary cubicle 22 and at least one associated circuit breaker cubicle 122 in side-by-side relation. In the illustrated embodiment, the device section 120 includes a plurality of auxiliary cubicles 22 and a plurality of associated circuit breaker cubicles 122 in side-by-side relation. The auxiliary cubicles 22 each house an auxiliary compartment 10. The auxiliary compartments 10 may each carry at least one electrical device 23 for circuit breaker control. In the illustrated embodiment, a plurality of electrical devices 23 is located therein for circuit breaker control, as further shown in FIG. 3. Electrical devices 23 may include, for example, ohmmeters, ammeters, multi-meters, terminal blocks, relays, breaker control switches, push buttons, pilot lights, programmable logic controllers, fuses, potential transformers, control power transformers 21, mini-circuit breakers 37, and other types of instruments and testing devices suitable for the application. The circuit breaker cubicles 122 each house at least one switchgear circuit breaker 50 (shown schematically in FIG. 2) such as molded case circuit breakers, air circuit breakers, and other types of switchgear circuit breakers depending upon the application. The switchgear circuit breaker(s) 50 in circuit breaker cubicles 122 distribute power to the electrical device(s) 23 within the adjacent auxiliary compartment 10 and to loads connected to switchgear system 100.

Alternatively, one or more of the auxiliary cubicles 22 and/or circuit breaker cubicles 122 may be empty or serve as placeholders for later-installed electrical devices. The switchgear enclosure 110 shown in the illustrated embodiment has four auxiliary cubicles 22 and four circuit breaker cubicles 122 in each column with associated ones of the cubicles 22, 122 in side-by-side relation. However, it should be understood that different configurations for the auxiliary cubicles 22 and/or circuit breaker cubicles 122 may be employed. In addition, different numbers of auxiliary cubicles 22 and/or circuit breaker cubicles 122 may be employed depending on the application.

In many switchgear installations, the switchgear circuit breakers are installed in the same compartment as the electrical device(s) 23. This means that maintenance personnel cannot access the electrical device(s) 23 without being exposed to energized connections unless the switchgear system 100 is de-energized. Switchgear system 100 employs separate cubicles for the switchgear circuit breakers 50 and for the electrical devices 23, which allows for separation of the electrical device(s) 23 from the switchgear circuit breaker(s) 50 via the auxiliary compartments 10, which removably house the electrical device(s) 23 in the associated auxiliary cubicle 22.

In particular, auxiliary compartment 10 is configured to provide a withdrawable or movable auxiliary compartment 10 for housing the electrical device(s) 23 with the ability to provide separation from the circuit breaker 50 in the associated circuit breaker cubicle 122. Once the withdrawable auxiliary compartment 10 is disconnected physically and electrically from the corresponding switchgear 50 in the switchgear cubicle 122, the electrical device(s) 23 can be tested or repaired at a separate location nearby the switch-gear enclosure 110. In addition, the wiring 17 of auxiliary compartment 10 and its connections with a first connector 11 can be checked, along with the wiring and/or cabling for incoming power/communication cables 29 within the enclosure 110.

Figure 3:
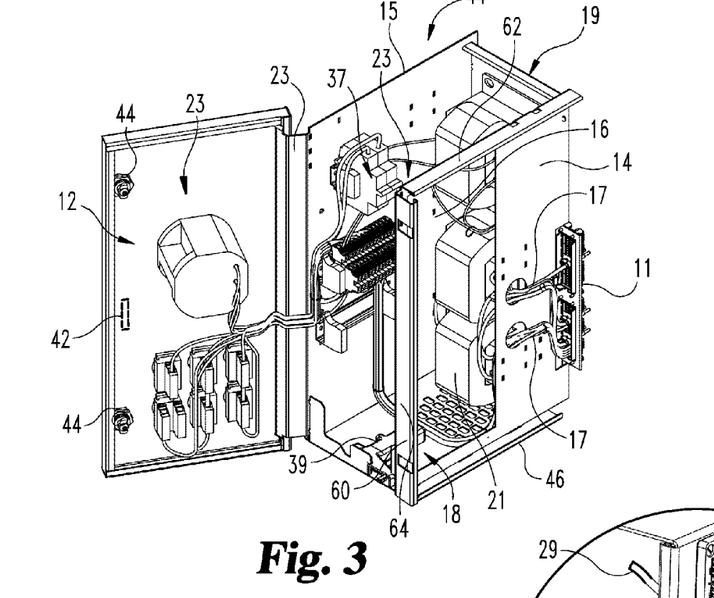
FIG. 3 is a perspective view of an auxiliary compartment including a first connector.

The withdrawable auxiliary compartment 10 includes a bottom wall 18, a rear wall 19, opposite sidewalls 14, 15 extending from and connected to bottom wall 18 and rear wall 19, and a door 12 pivotally connected to one of the sidewalls 15 with a hinge 20. Auxiliary compartment 10 also includes a strut 60 extending from bottom wall 18 to a flange 62 connected to sidewall 14. The door 12 may be provided with a handle 42 mounted on an outside surface of door 12 for ease of opening door 12. The side of door 12 opposite the hinge 20 can be locked to the adjacent column 60 with one or more quarter turn latches 44 mounted through door 12.

In an alternative embodiment, a top wall is provided on the auxiliary compartment 10 by, for example, a plate that extends between and connects sidewalls 14, 15 and rear wall 19. However, omission of the top wall as shown in the illustrated embodiment facilitates access to the electrical device(s) 23 when the auxiliary compartment 10 is withdrawn from auxiliary cubicle 22. In addition, sidewall 14 may only extend from rear wall 19 along part of the depth of auxiliary compartment 10 in order to define an opening 16 adjacent the front side of auxiliary compartment 10 that permits access to electrical device(s) 23 therein. In the illustrated embodiment, opening 16 is defined between strut 60, bottom wall 18, an edge of sidewall 14, and flange 62.

Figure 4:
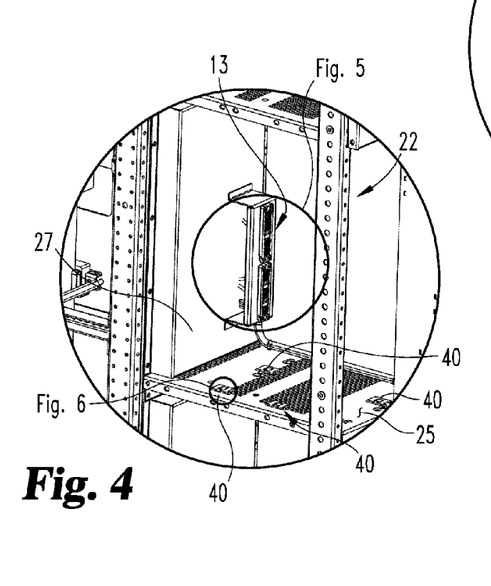
FIG. 4 is a perspective view showing a second connector engageable to the first connector and mounted to an inside wall of one of the auxiliary cubicles of the switchgear system of FIG. 1.
Figures 6, 7:
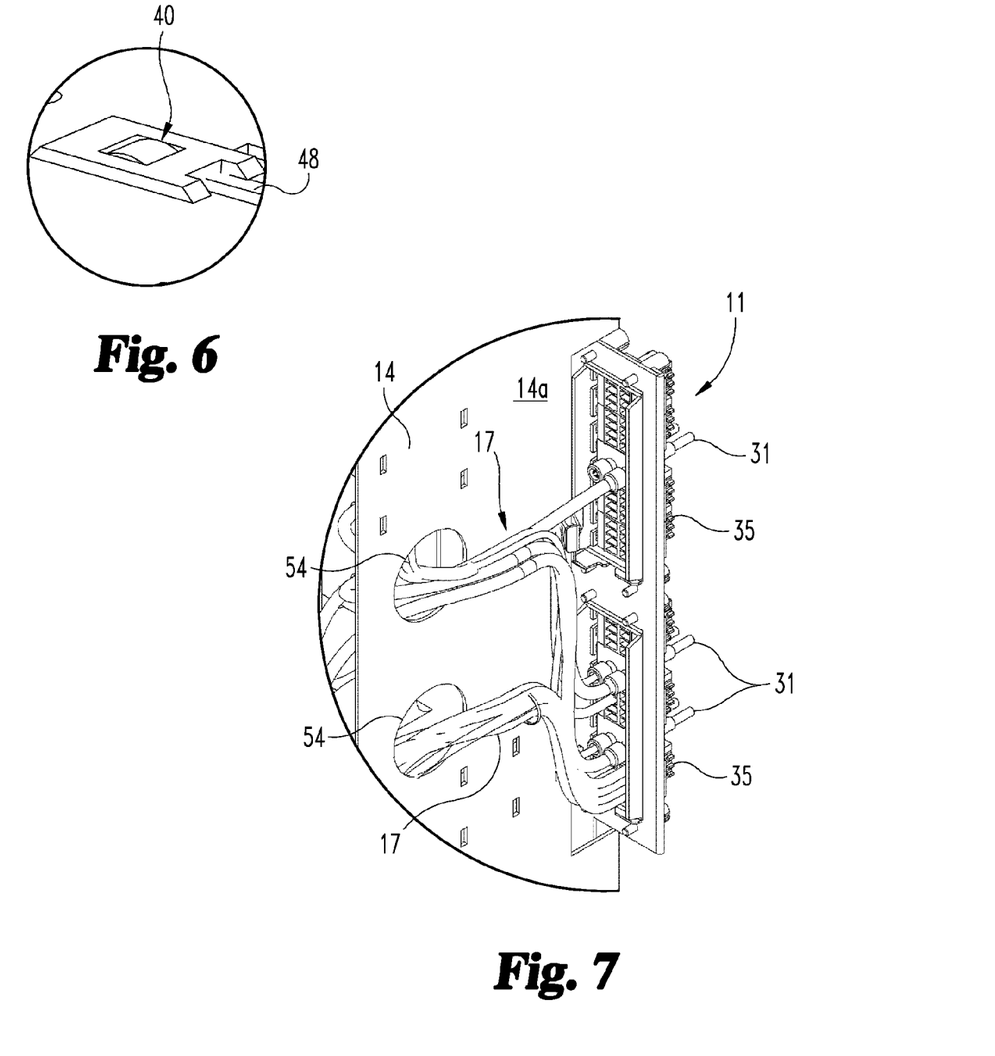
FIG. 6 is an enlarged perspective view of a roller located on the bottom of the auxiliary cubicle of FIG. 4.
FIG. 7 is an enlarged perspective view of the first connector of the auxiliary compartment.

The auxiliary compartment 10 may also be provided with rails 46 (only one shown) on bottom wall 18 extending along respective ones of the opposite sidewalls 14, 15 for interfacing with wheels or rollers 40 mounted to enclosure 110. Rollers 40 extend outwardly from a bottom surface 25 of the respective auxiliary cubicle 26 of the enclosure 110 as shown in FIGS. 4 and 6. In the illustrated embodiment, four rollers 40 are shown, although more or fewer rollers are also contemplated. In addition, tracks 48 can extend along bottom surface 25 and interface with rails 46 to provide alignment of the auxiliary compartment 10 as it is withdrawn from and inserted into auxiliary cubicle 22. In alternative embodiments, the rails 46 are not present and/or the bottom wall 18 of the auxiliary compartment 10 is in direct contact with the rollers 40.

The electrical device(s) 23 in the auxiliary compartment 10 are connected through cables or wiring 17 to a male-type connector provided by the first connector 11 of auxiliary compartment 10 (shown in FIGS. 3 and 7). The circuit breaker 50 in circuit breaker cubicle 122 is connected through incoming power and communications cables 29 to a female-type connector having receptacles formed by second connector 13. The receptacles of second connector 13 are configured to receive the plug-in ends of first connector 11 so that the first and second connectors 11, 13 are removably connected together to provide power and communications. As shown in FIG. 7, the first connector 11 has plug-in type ends for power connection members 31 and for breaker control communication connection members 35. The power connection members 31 provide electrical power to electrical devices 23 in auxiliary compartment 10, while the breaker control communication connection members 35 provide communication capability between the circuit breaker 50 in circuit breaker cubicle 122 and the various electrical device(s) 23 of the associated auxiliary compartment 10.

Examples of types of first and second connectors 11, 13 that may be used include, for example, the contact inserts VC-AFOS 2—catalog number 1885240, VC-TFOS 2—catalog number 1855814, VC-AMS 8—catalog number 1854022, VC-TFS 8—catalog number 1852820 available from Phoenix Contact of Blomberg, Germany. However, it should be understood that any suitable connectors may be used for first and second connectors 11, 13. In addition, second connector 13 may be a male-type connector and first connector 11 may be a female type connector.

The first connector 11 is fixedly mounted to the sidewall 14 of the auxiliary compartment 10 adjacent to but offset forwardly from the rear wall 19. First connector 11 is mounted to a side 14a of sidewall 14 that is opposite electrical device(s) 23 so that sidewall 14 shields first connector 11 from electrical device(s) 23. In addition, sidewall 14 includes holes 54 to receive wiring 17 therethrough to connect electrical device(s) 23 to first connector 11. Strut 60 projects laterally from an inner edge 64 thereof that is aligned with side 14a of sidewall 14 so that strut 60 has a width that extends over or overlaps first connector 11 when viewed frontally, as shown in FIG. 2. When auxiliary compartment 10 is seated in auxiliary cubicle 22, the first and second connectors 11, 13 are completely mated with one another and strut 60 completes the enclosure of auxiliary cubicle 22 by being position along the adjacent vertical strut of the enclosure 110.

Figure 5:
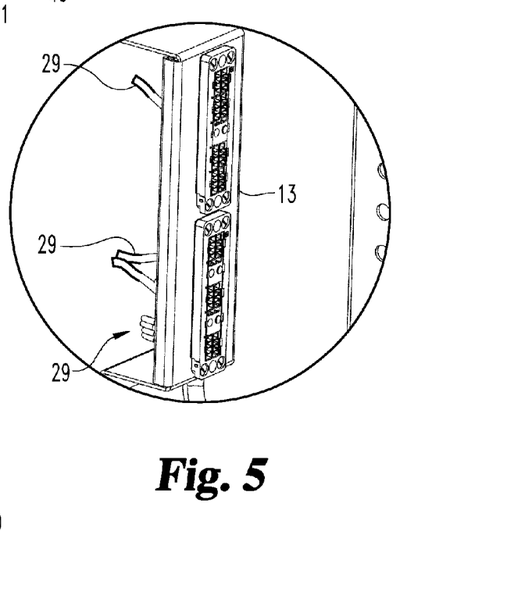
FIG. 5 is an enlarged perspective view of the second connector of FIG. 4 showing the incoming power and communications connections from the circuit breaker cubicle.

The circuit breaker cubicle 122 includes power and communications cables 29 extending therefrom for connection to second connector 13. Second connector 13 is mounted on the rear wall 27 of auxiliary cubicle 22 in alignment with first connector 11 mounted to the sidewall 14 of auxiliary compartment 10. The forward offset of first connector 11 allows the mating connection between first and second connectors 11, 13 to occur when auxiliary compartment 10 is fully inserted into and seated within the auxiliary cubicle 22. The connection between first and second connectors 11, 13 provides a quick connection arrangement that can be readily established or disengaged by the sliding movement of auxiliary compartment 10 into or out of auxiliary cubicle 22, respectively. In the illustrated embodiment, the first and second connectors 11, 13 are fixedly attached near the adjacent associated circuit breaker cubicle 122.

When the auxiliary compartment 10 is withdrawn, the force of the partial withdrawal of the auxiliary compartment 10 allows for a quick disconnection between the first connector 11 and the second connector 13. In one embodiment, partial withdrawal of the auxiliary compartment 10 first disconnects the breaker control or communication connection members 31 of first connector 11, and then additional partial withdrawal disconnects the longer, elongated power connection members 35 of first connector 11. Conversely, insertion of auxiliary compartment 10 first establishes connection of the elongated power connection members 35 and then breaker control connection members 31. In a specific embodiment, the withdrawal of the auxiliary compartment 10 by a first distance disconnects the control/communication connection members 35, and the withdrawal of auxiliary compartment 10 by a second distance that is greater than the first distance disconnects the power connection members 31. In one embodiment, the second distance is at least twice the first distance to the disconnection/connection events are discrete events.

The auxiliary compartment 10 is removed from the corresponding auxiliary cubicle 22 by the following method. The door 12 of auxiliary compartment 10 is opened, if a door is provided. A switchgear interlock lever 39, if provided, can then be released to unlock auxiliary compartment 10 and allow it to move in the auxiliary cubicle 22. The interlock lever 39 can be pivotally mounted to bottom wall 18 and releasably engage enclosure 110 in the auxiliary cubicle 22. In other embodiments, the door 12 is not provided and auxiliary compartment 10 includes a handle 42 mounted to a front wall that allows the entire auxiliary compartment 10 to be pulled open or pushed close like a drawer.

The auxiliary compartment 10 is withdrawn on rollers 40 along the bottom surface 25 of the auxiliary cubicle 22. The action of partially withdrawing the auxiliary compartment 10 sequentially disconnects the power and control connection members 31, 35 of the first and second connectors 11, 13 as previously described. The auxiliary compartment 10 is then further or fully withdrawn from the auxiliary cubicle 22. The electrical device(s) 23 inside the auxiliary compartment 10 are then available for maintenance and testing without exposing personnel to an energized circuit breaker cubicle 122 since the first connector 11 of auxiliary compartment 10 is disconnected from the second connector 13 of circuit breaker cubicle second connector 13.

Various aspects of the present disclosure are contemplated. According to one aspect, a switchgear system includes an enclosure for switchgear that includes a number of sections. A first section of the enclosure includes a plurality of circuit breakers and electrical devices for controlling the plurality of circuit breakers. The first section also includes a plurality of circuit breaker cubicles for housing respective ones of the plurality of circuit breakers, a plurality of auxiliary cubicles associated with respective ones of the plurality of circuit breaker cubicles, and a plurality of auxiliary compartments removably engaged in respective ones of the plurality of auxiliary cubicles. Each of the auxiliary compartments houses at least one of the electrical devices for controlling the respective circuit breaker of the associated circuit breaker cubicle. Each of the auxiliary compartments further includes a first connector electrically connected to the at least one of the electrical devices housed therein. Each of the auxiliary cubicles includes a second connector therein that is connected to the respective circuit breaker. Power and communication connections are established by the first and second connectors between the respective circuit breaker and the at least one of the plurality of electrical devices associated therewith when the respective auxiliary compartment is seated within the respective auxiliary cubicle. The power and communication connections are terminated when the auxiliary compartment is at least partially withdrawn from the respective auxiliary cubicle.

In one embodiment, each of the auxiliary compartments includes a bottom wall, a rear wall, and opposite first and second sidewalls extending from the bottom wall along the rear wall. In a refinement of this embodiment, the auxiliary compartment includes a door connected by a hinge along the first sidewall opposite the rear wall. In a further refinement, the door includes at least one latch opposite the hinge for releasably engaging the auxiliary compartment. In yet a further refinement, the door includes a handle adjacent the at least one latch.

In another refinement of the previous embodiment, a strut extends from the bottom wall at a front of the auxiliary compartment to a flange at a top of the auxiliary compartment. The flange extends from the strut to the second sidewall. A window in the auxiliary compartment is defined by the strut, the flange, the second sidewall and the bottom wall. In a further refinement, the first connector is mounted to a side of the second sidewall that is opposite the first sidewall. In yet a further refinement, the side of the second sidewall is aligned with an inner edge of the strut and the strut extends outwardly from the inner edge to overlap the first connector. In another refinement, at least one hole extends through the second sidewall, and wires extend through the at least one hole to connect the at least one of the electrical devices in the auxiliary compartment with the first connector.

In another embodiment, the first connector includes a plurality of communication connection members and a number of longer, elongated power connection members that are received in aligned receptacles of the second connector. In yet another embodiment, the auxiliary cubicle includes a bottom surface and a plurality of rollers extending upwardly from the bottom surface that contact and facilitate auxiliary compartment withdrawal from and insertion into the auxiliary cubicle.

In still another embodiment, each of the auxiliary compartments includes a bottom wall, a rear wall, and opposite first and second sidewalls extending from the bottom wall along the rear wall. The first connector is mounted to a side of the second sidewall that is opposite the first sidewall. The second connector is mounted to a rear wall of the auxiliary cubicle. In a refinement of this embodiment, at least one hole extends through the second sidewall, and wires extend through the at least one hole to connect the at least one of the electrical devices in the auxiliary compartment with the first connector.

According to another aspect, an electrical switchgear system is disclosed that includes an enclosure. The enclosure includes an auxiliary cubicle for removably receiving an auxiliary compartment. The auxiliary compartment houses electrical device(s) associated with at least one circuit breaker of the switchgear system. The enclosure includes a circuit breaker cubicle adjacent to the auxiliary cubicle for housing a circuit breaker and distributing power to the electrical device(s) housed in the auxiliary compartment. The enclosure includes a first connector mounted to a sidewall of the auxiliary compartment. The first connector is electrically connected to the electrical device(s) in the auxiliary compartment and a second connector is mounted to a rear wall of the auxiliary cubicle. The second connector is electrically connected to the circuit breaker. The first and second connectors are connected when the auxiliary compartment is seated in the auxiliary cubicle and the first and second connectors are disconnected when the auxiliary compartment is at least partially withdrawn from the auxiliary cubicle.

In one embodiment, a communications connection between the first and second connectors is disconnected when the auxiliary compartment is withdrawn a first distance from the auxiliary cubicle while a power connection between the first and second connectors remains established at the first distance. In another embodiment, the first connector is located on a first side of the sidewall and the electrical device(s) are located on a second side of the sidewall opposite the first side.

According to another aspect, a method for accessing control electronics for a circuit breaker of a switchgear system is provided. The method includes providing power and communications between the circuit breaker and control electronics for controlling the circuit breaker through the electrical connection of first and second connectors, the circuit breaker being housed in a circuit breaker cubicle of a switchgear enclosure, the control electronics being housed in an auxiliary compartment positioned in an auxiliary cubicle of the switchgear enclosure; partially withdrawing the auxiliary compartment from the auxiliary cubicle of the switchgear to at least partially disconnect the first connector from the second connector, the first connector being mounted to the auxiliary compartment and the second connector being mounted in the auxiliary cubicle; and removing the auxiliary compartment from the auxiliary cubicle while the circuit breaker is energized and the control electronics are not energized.

In one embodiment of the method, partially withdrawing the auxiliary compartment disconnects communication connections between the circuit breaker and the control electronics while power connections between the circuit breaker and the control electronics remain established. In a refinement of this embodiment, removing of the auxiliary compartment disconnects the power connections.

In another embodiment of the method, the first connector is electrically connected to the control electronics and the second connector is electrically connected to the circuit breaker, the first connector including power connection members and communication connection members that are received in corresponding receptacles of the second connector.

As used herein the term "configured" should be interpreted to mean that the identified elements, components, or other subject matter are selected, created, implemented, utilized, designed, modified, adjusted and/or intended to perform the indicated action and/or to perform, operate, behave and/or react in the indicated manner.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and subcombinations of the various elements, features, functions and/or properties disclosed herein. Similarly, recitation of "a," "a first" or "the" element, or the equivalent thereof, should be understood to include incorporation of one or more such elements, neither requiring nor excluding two or more such elements, unless the context clearly indicates otherwise. As used herein, the terms "having", "containing", "including", "comprising" and the like are open ended terms that indicate the presence of stated elements or features, but do not preclude additional elements or features.

While the present application illustrates various embodiments, and while these embodiments have been described in some detail, it is not the intention of the applicant to restrict or in any way limit the scope of the appended claims to such detail. Additional advantages and modifications will readily appear to those skilled in the art. Therefore, the invention, in its broader aspects, is not limited to the specific details, the representative embodiments, and illustrative examples shown and described. Accordingly, departures may be made from such details without departing from the spirit or scope of the applicant's general inventive concept.

What is claimed is:
1. A switchgear system, comprising:
an enclosure for switchgear including a number of sections, wherein a first section of the enclosure includes a plurality of circuit breakers and electrical devices for controlling the plurality of circuit breakers, wherein the first section includes:
at least one circuit breaker cubicle for housing at least one of the circuit breakers; at least one auxiliary cubicle associated with the at least one circuit breaker cubicle; and at least one auxiliary compartment removably engaged in the at least one auxiliary cubicle, wherein the at least one auxiliary compartment houses at least one of the electrical devices for controlling a respective one of the circuit breakers of the at least one circuit breaker cubicle associated with the at least one auxiliary cubicle, the at least one auxiliary compartment further including a first connector electrically connected to the at least one of the electrical devices housed therein, wherein the at least one auxiliary cubicle includes a second connector therein that is connected to the respective one of the circuit breakers, wherein:
power and communication connections are established by the first and second connectors between the respective one of the circuit breakers and the at least one of the electrical devices associated therewith when the at least one auxiliary compartment is seated within a respective one of the at least one auxiliary cubicle; and
the power and communication connections are terminated when the at least one auxiliary compartment is at least partially withdrawn from the respective one of the at least one auxiliary cubicle.

2. The switchgear system of claim 1, wherein the at least one auxiliary compartment includes a bottom wall, a rear wall, and opposite first and second sidewalls extending from the bottom wall along the rear wall.

3. The switchgear system of claim 2, wherein the at least one auxiliary compartment includes a door connected by a hinge along the first sidewall opposite the rear wall.

4. The switchgear system of claim 3, wherein the door includes at least one latch opposite the hinge for releasably engaging the at least one auxiliary compartment.

5. The switchgear system of claim 4, wherein the door includes a handle adjacent the at least one latch.

6. The switchgear system of claim 2, further comprising:
a strut extending from the bottom wall at a front of the at least one auxiliary compartment to a flange at a top of the at least one auxiliary compartment, wherein the flange extends from the strut to the second sidewall; and
a window in the at least one auxiliary compartment is defined by the strut, the flange, the second sidewall and the bottom wall.

7. The switchgear system of claim 6, wherein the first connector is mounted to a side of the second sidewall that is opposite the first sidewall.

8. The switchgear system of claim 7, wherein the side of the second sidewall is aligned with an inner edge of the strut and the strut extends outwardly from the inner edge to overlap the first connector.

9. The switchgear system of claim 7, further comprising at least one hole through the second sidewall, and further comprising wires extending through the at least one hole connecting the at least one of the electrical devices in the at least one auxiliary compartment with the first connector.

10. The switchgear system of claim 1, wherein the first connector includes a plurality of communication connection members and a number of longer, elongated power connection members that are received in aligned receptacles of the second connector.

11. The switchgear of claim 1, wherein the at least one auxiliary cubicle includes a bottom surface and a plurality of rollers extending upwardly from the bottom surface that contact and facilitate the at least one auxiliary compartment withdrawal from and insertion into the at least one auxiliary cubicle.

12. The switchgear system of claim 1, wherein:
the at least one auxiliary compartment includes a bottom wall, a rear wall, and opposite first and second sidewalls extending from the bottom wall along the rear wall;
the first connector is mounted to a side of the second sidewall that is opposite the first sidewall; and
the second connector is mounted to a rear wall of the at least one auxiliary cubicle.

13. The switchgear system of claim 12, further comprising at least one hole through the second sidewall, and further comprising wires extending through the at least one hole connecting the at least one of the electrical devices in the at least one auxiliary compartment with the first connector.

14. An electrical switchgear system, comprising:
an enclosure including:
an auxiliary cubicle for removably receiving an auxiliary compartment, the auxiliary compartment housing at least one electrical device structured to control at least one circuit breaker of the switchgear system;
a circuit breaker cubicle adjacent the auxiliary cubicle for housing the at least one circuit breaker and distributing power to the at least one electrical device housed in the auxiliary compartment;
a first connector mounted to a sidewall of the auxiliary compartment, the first connector being electrically connected to the at least one electrical device in the auxiliary compartment; and
a second connector mounted to a rear wall of the auxiliary cubicle, the second connector being electrically connected to the at least one circuit breaker, the first and second connectors being connected when the auxiliary compartment is seated in the auxiliary cubicle and the first and second connectors being disconnected when the auxiliary compartment is at least partially withdrawn from the auxiliary cubicle.

15. The electrical switchgear system of claim 14, wherein a communications connection between the first and second connectors is disconnected when the auxiliary compartment is withdrawn a first distance from the auxiliary cubicle while a power connection between the first and second connectors remains established at the first distance.

16. The electrical switchgear of claim 14, wherein:
the first connector is located on a first side of the sidewall; and
the at least one electrical device is located on a second side of the sidewall opposite the first side.

17. A method for accessing control electronics for a circuit breaker of a switchgear system, comprising:
providing power and communications between the circuit breaker and control electronics for controlling the circuit breaker through the electrical connection of first and second connectors, the circuit breaker being housed in a circuit breaker cubicle of a switchgear enclosure, the control electronics being housed in an auxiliary compartment positioned in an auxiliary cubicle of the switchgear enclosure;
partially withdrawing the auxiliary compartment from the auxiliary cubicle of the switchgear to at least partially disconnect the first connector from the second connector, the first connector being mounted to the auxiliary compartment and the second connector being mounted in the auxiliary cubicle; and
removing the auxiliary compartment from the auxiliary cubicle while the circuit breaker is energized and the control electronics are not energized.

18. The method of claim 17, wherein partially withdrawing the auxiliary compartment disconnects communication connections between the circuit breaker and the control electronics while power connections between the circuit breaker and the control electronics remain established.

19. The method of claim 18, wherein the removing of the auxiliary compartment disconnects the power connections.

20. The method of claim 17, wherein the first connector is electrically connected to the control electronics and the second connector is electrically connected to the circuit breaker, the first connector including power connection members and communication connection members that are received in corresponding receptacles of the second connector.

* * * * *